United States Patent [19]

Ludwig

[11] 4,166,156
[45] * Aug. 28, 1979

[54] SECONDARY BATTERY OR CELL WITH PYROLYTIC GRAPHITE COATED GRAPHITE CURRENT COLLECTOR

[75] Inventor: Frank A. Ludwig, Southfield, Mich.

[73] Assignee: Ford Motor Company, Dearborn, Mich.

[*] Notice: The portion of the term of this patent subsequent to Sep. 13, 1994, has been disclaimed.

[21] Appl. No.: 772,616

[22] Filed: Feb. 28, 1977

[51] Int. Cl.² ........................................... H01M 10/39
[52] U.S. Cl. .................................... 429/104; 429/122; 429/209
[58] Field of Search ........................ 429/104, 101–103, 429/218, 233, 245, 209, 31, 122, 163, 164; 427/228

[56] References Cited

U.S. PATENT DOCUMENTS

| | | | |
|---|---|---|---|
| 3,854,979 | 12/1974 | Rossi | 427/228 |
| 3,982,957 | 9/1976 | Jones et al. | 429/104 X |
| 3,993,503 | 11/1976 | Ludwig | 429/103 |
| 4,011,367 | 3/1977 | Evans et al. | 429/104 |

Primary Examiner—Anthony Skapars
Attorney, Agent, or Firm—Roger L. May; Keith L. Zerschling

[57] ABSTRACT

An improved secondary battery or cell of the type having: (A) an anodic reaction zone containing a molten alkali metal reactant-anode in electrical contact with an external circuit; (B) one or more cathodic reaction zones containing a cathodic reactant which, when said battery or cell is at least partially discharged, is selected from the group consisting of (i) a single phase composition comprising molten polysulfide salts of said anodic reactant and (ii) a two-phase composition comprising molten sulfur and molten sulfur saturated polysulfide salts of said anodic reactant; (C) a cation-permeable barrier to mass liquid transfer interposed between and in contact with said anodic and cathodic reaction zones; and (D) a current collector which at least partially exposed to said cathodic reactant and which is in electrical contact with both said cation-permeable barrier and said external circuit. The improvement comprises employing in said device a current collector comprising a graphite body bearing a coating of pyrolytic graphite on at least those surfaces thereof which are exposed to said cathodic reactant.

11 Claims, 3 Drawing Figures

U.S. Patent  Aug. 28, 1979  4,166,156
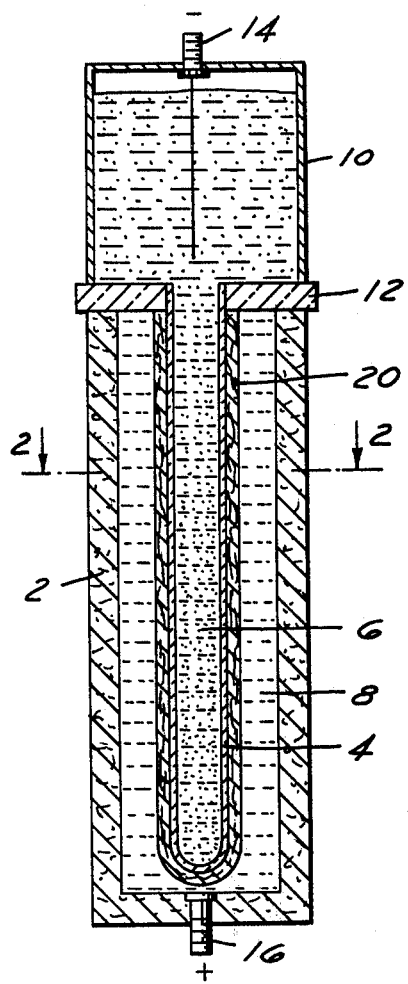
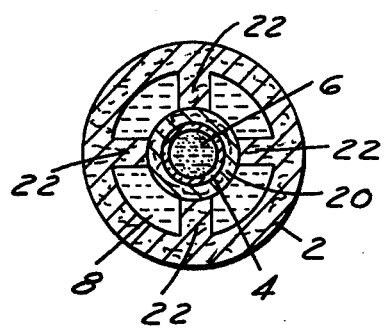
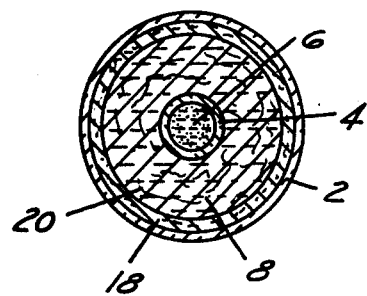

SECONDARY BATTERY OR CELL WITH PYROLYTIC GRAPHITE COATED GRAPHITE CURRENT COLLECTOR

The invention herein described was made in the course of or under a contract or subcontract thereunder with the National Science Foundation.

This application relates to an improved secondary battery or cell.

More particularly, this application relates to an improved secondary battery or cell of the type comprising a molten alkali metal anode, a cathode containing a liquid electrolyte electrochemically reversibly reactive with said alkali metal, a cation-permeable barrier to mass liquid transfer interposed between and in contact with said anode and said liquid electrolyte and a current collector in electrical contact with said cation-permeable barrier and said external circuit.

This application still more particularly relates to an improved sodium sulfur battery or cell.

BACKGROUND OF THE INVENTION

A recently developed type of secondary battery or rechargeable electrical conversion device comprises: (1) an anodic reaction zone containing a molten alkali metal anode-reactant, e.g., sodium, in electrical contact with an external circuit; (2) a cathodic reaction zone containing a cathodic reactant comprising a liquid electrolyte, e.g., sulfur or a mixture of sulfur and molten polysulfide, which is electrochemically reversibly reactive with said anodic reactant; (3) a solid electrolyte comprising a cation-permeable barrier to mass liquid transfer interposed between and in contact with said anodic and cathodic reaction zones; and (4) a current collector which is in electrical contact with both said cation-permeable barrier and said external circuit. As used herein the term "reactant" is intended to mean both reactants and reaction products.

One of the primary problems which must be overcome before the alkali metal/sulfur cells or batteries of the above type become commercially feasible involves materials. In particular, that problem involves the selection of current collector and/or container or liner materials which will be stable in corrosive polysulfide salts generated during discharge of the cell or battery. While metals are likely candidates for use as current collectors and/or containers or liners since they are conductive and nonporous, they tend to corrode in the presence of polysulfide salts. Graphite, on the other hand, is fairly noncorrodable in polysulfide melts and is conductive, but is porous to the melt and gases generated during operation of the cell and tends to oxidize in the presence of air.

It is an object of this invention to provide an improved battery or cell of the above type wherein the current collector and/or container or liner is not only conductive and non-corrosive as in the case of graphite, but is also nonporous as in the case of metals.

BRIEF DESCRIPTION OF THE INVENTION

This object and other more detailed objects which will be apparent to those skilled in the art are accomplished by the improvement of this invention which comprises employing as the current collector and/or container or liner of the cell or battery a composite comprising a shaped graphite body bearing a coating of pyrolytic graphite on at least those surfaces thereof which are exposed to said cathodic reactant during the operation of the cell. More particularly, the invention involves employing graphite bodies which are also impregnated with said pyrolytic graphite.

Although the coated and impregnated body may serve solely as the current collector for such a battery or cell, it is also suited to serve the dual purpose of current collector/liner or a current collector/container. In a preferred embodiment, the cathodic reaction zone also contains a porous electrode and the contact between the porous electrode and the current collector/container or liner is effected by a pyrolytic carbon bond.

The invention will be more fully understood after reading the following detailed description thereof in conjunction with the drawings in which:

FIG. 1 shows a vertical sectional view of the cell to which the improvement of this invention may be applied and FIGS. 2 and 3 show the exemplary cross-sectional views of such a cell.

DETAILED DESCRIPTION OF THE INVENTION

Description of Device to Which Improvement Applies

The secondary or rechargeable electrical conversion devices to which the improvement of this invention applies and various components thereof are well known to those skilled in the art and are disclosed in a number of U.S. patents including the following: U.S. Pat. Nos. 3,404,035; 3,404,036; 3,413,150; 3,446,677; 3,458,356; 3,468,709; 3,468,719; 3,475,220; 3,475,223; 3,475,225; 3,535,163; 3,719,531; 3,811,493; 3,951,689; 3,966,492; 3,976,503; 3,980,496; 3,985,575; 3,985,576; 3,993,503; 3,994,745; 4,002,806; and 4,002,807.

As mentioned above, the type of secondary battery or cell to which the improvement of this invention applies generally comprises: (1) an anodic reaction zone containing a molten alkali metal-anode in electrical contact with an external circuit; (2) a cathodic reaction zone containing a cathodic reactant comprising a liquid electrolyte selected from sulfur or a mixture of sulfur and sulfur saturated polysulfide salts of said molten alkali metal reactant which are electrochemically reversibly reactive with said anodic reactant; (3) a cation-permeable barrier to mass liquid transfer interposed between and in contact with said anodic and cathodic reaction zones; and (4) a current collector which is at least partially exposed to said cathodic reactant.

The anodic reactant employed in such device is an alkali metal which is maintained above its melting point when the device is in operation. The anodic reactant is heated by any conventional means including, but not by way of limitation, Joule heating, induction heating, and heat exchange with a suitable fluid. The anodic reactant may also be viewed as the anode proper or conductor through which the electron flow to the external circuit is achieved. A cell component of this type is conventionally referred to in the art as a sacrificial electrode in that while it is serving the role of a conductor it is also undergoing an electrochemical reaction. Molten sodium is employed as the anodic reactant in the most preferred embodiments of such devices. However, potassium, lithium and other alkali metals mixtures of such alkali metals, or alloys containing such alkali metals may be used. It will be recognized by those skilled in the art that certain alkali metals are better suited for used in conjunction with particular cation-permeable barriers.

The cathodic reactant is a molten material, e.g., molten sulfur, which is electrochemically reversibly reactive with the anodic reactant. As the device begins to discharge, the mole fraction of elemental sulfur drops while the open cell voltage remains constant. During this portion of the discharge cycle, as the mole fraction of sulfur drops from 1.0 to approximately 0.72 the cathodic reactant displays two phases, one being essentially pure sulfur and the other being sulfur saturated alkali metal polysulfide in which the mole ratio of sulfur to alkali metal is about 5.2:2. When the device is discharged to the point where the mole fraction of sulfur is about 0.72, the cathodic reactant becomes one phase in nature since all elemental sulfur has formed polysulfide salts. As the device is discharged further, the cathodic reactant remains one phase in nature and as the mole fraction of sulfur drops, so does the open circuit voltage corresponding to the change in the potential determining reaction. Thus, the device continues to discharge from a point where polysulfide salts contain sulfur and alkali metal in a mole ratio of approximately 5.2:2 to the point where polysulfide salts contain sulfur and alkali metal in a ratio of about 3:2. At this point the device is fully discharged.

The anodic reactant is separated from the cathodic reactant by a solid barrier to mass liquid transfer that is selectively ionically conductive with respect to cations of the anodic reactant and substantially impermeable to other ions which may be stored in the cathodic reactant. Thus, the reaction zone separator or solid electrolyte is a material which will permit the transfer of the ions of the anodic reactant through the separator and into the cathodic reactant during operation of the device. The cathodic reactant together with thhe separator provides a sufficient barrier to free electron flow in the internal portion of the electrical circuit to permit a difference of potential to develop at the respective electrodes of the device in operation. It is preferred that the separator be as thin as possible without unduly sacrificing strength. Although optimum thickness may vary with intended use, separators having a thickness in the range of about 20 to about 2000, preferably about 100 to about 1000, microns have been found to be effective.

Both glass and polycrystalline ceramic materials have been found suitable for use in such devices as the cation-permeable barrier or reaction zone separator. The various glasses which are suitable as cation-permeable barriers are described in many of the aforementioned patents. The glasses disclosed therein may be prepared by conventional glass making procedures using the ingredients described therein and firing at temperatures of about 2700° F.

The polycrystalline ceramic materials useful as cation-permeable barriers are bi- or multi-metal oxides. Such materials are described in a number of the aforementioned patents. Among the most preferred of these materials are those in the family of beta-type alumina, all of which exhibit a generic crystalline structure which is readily identifiable by x-ray diffraction. Thus, beta-type alumina or sodium beta-type alumina is a material which may be thought of as a series of layers of aluminum oxide held apart by columns of linear Al-O bond chains with sodium ions occupying sites between the layers and columns. Among the numerous useful polycrystalline beta-type-alumina materials are: (1) standard beta-type alumina; (2) boron oxide ($B_2O_3$) modified beta-type alumina; (3) substituted beta-type-alumina; and (4) beta-type alumina which is modified by the addition of a minor proportion by weight of metal ions having a valence not greater than 2.

The devices to which the improvement of this invention applies may also include a cathodic electrode or porous conductive material which is in electrical contact with the cation-permeable barrier and the external circuit via the current collector. The conductive material is of significantly greater surface area than a solid cathode and may comprise any porous material which is electronically conductive and which is resistant to attack by reactants within the cathodic reaction zone. Among the many materials which may be employed are felts or foams of graphite or vitreous carbon.

While the secondary cells or batteries to which the improvement of the invention is applicable may have a number of different configurations, several of which are disclosed in the above-incorporated patents, a preferred configuration comprises: (1) a container, preferably tubular; (2) a cation-permeable barrier to mass liquid transfer, preferably tubular, which is disposed within said container so as to create a first reaction zone within said and a second reaction zone between said barrier and said container; (3) a molten alkali metal anode reactant within the anodic reaction zone, which is typically the first reaction zone formed within the cation-permeable barrier; (4) a cathodic reactant comprising a liquid electrolyte which is electrochemically reversibly reactive with said anodic reactant and which, at least in the partially discharged state is selected from the group consisting of (a) a single phase composition comprising molten polysulfide salts of said anodic reactant and (b) a two phase composition comprising molten sulfur and molten sulfur saturated polysulfide salts of said anodic reactant disposed in a cathodic reaction zone, which is typically the second reaction zone formed between said container and said cation-permeable barrier.

Improvement of the Invention

As generally discussed above, the improvement of this invention involves use of a graphite body bearing a coating of pyrolytic graphite as the current collector or a current collector/container or current collector/liner in the secondary battery or cell of the type discussed above, wherein the pyrolytic graphite coating covers at least those surfaces of said current collector which are exposed to the corrosive polysulfide cathodic reactant during operation of the battery or cell. Generally, the graphite body is not only coated, but is also impregnated with said pyrolytic graphite. As mentioned above, the pyrolytic graphite coated impregnated graphite body may serve solely as the current collector in the cathodic reaction zone of the device. Alternatively, it may be used as a current collector/liner disposed internally and in contact with a conductive container, e.g., metal. Still further, it may in certain circumstances serve as a current collector/container of the device.

Although tubular pyrolytic graphite coated bodies prepared in accordance with the invention exhibit excellent radial conductively, the axial conductivity of such bodies may be considered marginal in all except very short cells. Therefore, it may be desirable in many application to provide such a current collector or current collector/container with a metal surface such as by plating chromium, nickel or other metals by known means on the surface thereof opposite to the pyrolytic graphite vitreous carbon surface which will be exposed to the cathodic reactant. Since known plating techniques are most successful when the graphite surface to be coated is porous, it is desirable when preparing the pyrolytice graphite vitreous carbon coated graphite body to be plated, to not apply the pyrolytic graphite coating to the surface which is to be plated. A plate of several mils or more in thickness is sufficient to provide the required axial conductivity.

When the pyrolytic graphite coated and impregnated body is used as a current collector/liner which is in direct electrical contact with a metal container, the container provides the necessary axial conductively. Good electrical contact may be achieved between the metal and the impregnated body by compressed metal felt or graphite felt. The metal container, a cylinder in a preferred embodiment, may be of various grades of stainless steel or other metals.

In those embodiments of the invention wherein the pyrolytic graphite coated graphite serves as the current collector/container or as the current collector/liner, a porous electrode disposed within the cathodic reaction zone is also employed and is bonded to said current collector by pyrolytic graphite, thus making an excellent electrical contact and a good mechanical bond.

The device shown in FIG. 1 is representative of the type of battery or cell to which the improvement of this invention may be applied. The various parts of the cell or battery, which are discussed above, include container 2, cation-permeable barrier 4, anodic reactant alkali metal 6 and cathodic reactant 8. Also shown are an alkali metal reservoir 10, which is electrically insulated from said cathodic reaction zone by insulating ceramic header 12, lead 14 from said alkali metal to the external circuit and lead 16 shown in FIG. 1 being connected to the container and leading to said external circuit. Porous electrode 20 is disposed around cation-permeable barrier 4. FIGS. 2 and 3 show examples of cross sections of the type of cells to which the improvements of this invention may be applied. The numerals designate the same parts described above with respect to FIG. 1. FIG. 2 shows one embodiment of the use of the improvement of the invention wherein container 2 also serves as the current collector. The device shown in FIG. 2 in cross section also includes integral arms 22 extending from the container portion of the current collector inwardly toward the cation permeable barrier 4. Also included is a felt electrode 20 to which the arms of the current collector/container are bonded, preferably by vitreous carbon. As noted above, it may be desirable to plate a layer of metal on the exterior of container 2 to provide axial conductivity. Other means of providing axial conductivity, such as by embedding a wire mesh in the graphite body may also be apparent to those skilled in the art.

FIG. 3 shows another embodiment of the invention wherein a separate current collector 18 comprising the vitreous carbon coated graphite body is employed internally of container 2 which may be formed of any material, including an insulating material such as glass. In this embodiment lead 16 would be connected to current collector 18 rather than to the container wall. Also shown between cation-permeable barrier 4 and current collector 18 is a porous felt electrode 20 which completes the electrical connection between the cation permeable barrier and current collector 18.

The Figures illustrate the most preferred symmetry for the cells to which the improvement is applied, i.e., those which are cylindrical or tubular in nature. However, it will be appreciated by those skilled in the art that various cell configurations are suitable for the improvement of the invention. Thus, tubular configurations in which the anodic reactant is disposed in said second reaction zone and the cathodic reactant is disposed within said first reaction zone may be employed. In such an embodiment, the current collector would be disposed internally of the cation-permeable barrier and would not serve as the container. Other configurations, of a non-cylindrical or nontubular nature will also be apparent to those skilled in the art, particularly in view of the disclosures of the various patents cited above.

Pyrolytic carbon or graphite may be made by commercial processes known to those skilled in the art. Generally, pyrolytic carbon or graphite coatings are produced from gaseous or vaporized carbon compounds, which are decomposed pyrolytically at temperature ranging from 800° to 2800° C. Examples of suitable carbon compounds are methane, ethane, propane, acetylene, benzene, and carbon tetrachloride.

The structure and properties of such a pyrocarbon layer depends mainly on the temperature, pressure, residence time, and nature of the carbonaceous gas. The variability of pyrographite is extremely wide, and ranges from almost isotropic, via granular, to the highly anisotropic laminar structures. Pyrocarbon coatings are effective for use in this invention since they give graphite bodies a very smooth surface and make them substantially impermeable while greatly enhancing their resistance to corrosion by polysulfide melt. It is preferable to impregnate as well as to coat the surface of the graphite since when the pyrocarbon coating is applied only to the outer surface of the shaped body, it provides incomplete protection against corrosion. When just a coating is used and the protective layer is damaged, the corrosive material can pass through the pores of the graphite body. To prevent this problem, it is, thus desirable to deposite the pyrocarbon within the pores. This is possible at low deposition rates (low pressure, low temperature). When impregnated and coated, even after the surface of the shaped graphite body has been attacked, the protective action of the pyrocarbon in the pores persists.

As mentioned above, pyrolytic graphite coated graphite may be prepared in a manner which will be apparent to those skilled in the art and which is practiced commercially. Pyrolytic graphite coated graphite bodies may be purchased from a number of companies including Ultra Carbon Corporation of Bay City, Michigan and General Electric Corporation. Of course, it will be clear to those skilled in the art that the porous graphite felt may be bonded to the current collector by various materials, or not bonded at all.

In view of this disclosure, many modifications of this invention will be apparent to those skilled in the art. It is intended that all such modifications which fall within the scope of this invention be included within the terms of the appended claims.

I claim:

1. In a secondary battery cell of the type comprising: (A) an anodic reaction zone containing a molten alkali metal reactant-anode in electrical contact with an external circuit; (B) a cathodic reaction zone containing a cathodic reactant which, when said battery or cell is at least partially discharged, is selected from the group consisting of (i) a single phase composition comprising molten polysulfide salts of said anodic reactant sulfur saturated polysulfide salts of said anodic reactant; (C) a cation-permeable barrier to mass liquid transfer interposed between and in contact with said anodic and cathodic reaction zones; and (D) a current collector which is at least partially exposed to said cathodic reactant and which is in electrical contact with said cation-permeable barrier and said external circuit, wherein the improvement comprises:

a current collector comprising a graphite body bearing a coating of pyrolytic graphite on at least those surfaces thereof which are exposed to said cathodic reactant.

2. A secondary battery or cell in accordance with claim 1 wherein said current collector also serves as the container for the device.

3. A secondary battery or cell in accordance with claim 2 wherein said current collector/container has a plated metal surface which is not exposed to said cathodic reactant and which provides said container with axial conductivity.

4. A secondary battery or cell in accordance with claim 1 wherein said current collector also serves as a liner for the device and is disposed adjacent to and in electrical contact with an axially conductive container.

5. A secondary battery or cell in accordance with claim 1 wherein said graphite body is also impregnated with said pyrolytic graphite.

6. A secondary battery or cell in accordance with claim 1 wherein a porous electrode is disposed within said cathodic reaction zone and wherein contact between said porous electrode and said current collector is effected by a pyrolytic graphite bond.

7. A secondary battery or cell in accordance with claim 1 wherein a cylindrical or tubular container has disposed internally thereof a tubular or cylindrical cation-permeable barrier such that a first reaction zone is located internally of said cation-permeable barrier and a second reaction zone is located between the outer wall of said cation-permeable barrier and the inner wall of said container.

8. A secondary battery or cell in accordance with claim 7 wherein said first reaction zone is said anodic reaction zone and said second reaction zone is said cathodic reaction zone.

9. A secondary battery or cell in accordance with claim 8 wherein said current collector also serves as the container for the device.

10. A secondary battery or cell in accordance with claim 9 wherein said current collector/container has a plated surface which is not exposed to said cathodic reactant and which provides said container with axial conductivity.

11. A secondary battery or cell in accordance with claim 8 wherein said current collector also serves as a liner for the device and is disposed internally of and in electrical contact with an axially conductive container.

* * * * *